(12) United States Patent
Jones et al.

(10) Patent No.: US 7,712,016 B2
(45) Date of Patent: May 4, 2010

(54) METHOD AND APPARATUS FOR UTILIZING AN OBJECT MODEL FOR MANAGING CONTENT REGIONS IN AN ELECTRONIC DOCUMENT

(75) Inventors: Brian M. Jones, Redmond, WA (US); E. Mark Sunderland, Seattle, WA (US); Marcin Sawicki, Kirkland, WA (US); Robert A. Little, Redmond, WA (US); Tristan A. Davis, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1108 days.

(21) Appl. No.: 11/065,754

(22) Filed: Feb. 25, 2005

(65) Prior Publication Data

US 2006/0069989 A1 Mar. 30, 2006

Related U.S. Application Data

(63) Continuation-in-part of application No. 10/955,612, filed on Sep. 30, 2004.

(51) Int. Cl.
*G06F 17/00* (2006.01)
(52) U.S. Cl. .................. 715/200; 715/202; 715/209; 715/255
(58) Field of Classification Search ................ 715/200, 715/202, 209, 255
See application file for complete search history.

(56) References Cited

U.S. PATENT DOCUMENTS

| | | | |
|---|---|---|---|
| 5,287,504 A | 2/1994 | Carpenter et al. ........... 707/201 |
| 5,440,745 A | 8/1995 | Platte et al. .................. 718/101 |
| 5,630,131 A * | 5/1997 | Palevich et al. ............. 717/108 |
| 5,715,415 A | 2/1998 | Dazey et al. | |
| 5,717,741 A | 2/1998 | Yue et al. .................. 379/88.12 |
| 5,787,449 A | 7/1998 | Vulpe et al. .................. 715/203 |
| 5,845,299 A * | 12/1998 | Arora et al. .................. 715/209 |
| 5,903,902 A | 5/1999 | Orr et al. ..................... 715/202 |
| 5,910,075 A | 6/1999 | Arnell et al. .................... 49/25 |
| 5,911,068 A | 6/1999 | Zimmerman et al. ........ 719/328 |

(Continued)

FOREIGN PATENT DOCUMENTS

KR  2004-0020933 A  3/2004

(Continued)

OTHER PUBLICATIONS

Bodart, et al., "Architecture elements for highly-interactive business-oriented applications", Lecture Notes in Computer Science, Springer Berlin/Heidelberg, vol. 753/1993, copyright 1993, p. 83-104.*

(Continued)

*Primary Examiner*—Amelia Rutledge
(74) *Attorney, Agent, or Firm*—Merchant & Gould

(57) ABSTRACT

A method and apparatus are provided for utilizing a document object model to manage content regions for use in an electronic document. A content region is a predefined area which may be inserted in an electronic document and which serves as a placeholder for receiving and displaying specific types of content such as text, graphics data, calendar data, or tabular data. The document object model enables a user to create, modify, and delete content regions from an electronic document using an application programming interface from within a computer application program.

20 Claims, 3 Drawing Sheets

U.S. PATENT DOCUMENTS

| | | | |
|---|---|---|---|
| 5,974,430 A | 10/1999 | Mutschler et al. | 715/505 |
| 5,991,878 A | 11/1999 | McDonough et al. | 726/9 |
| 6,006,239 A | 12/1999 | Bhansali et al. | 707/201 |
| 6,014,677 A | 1/2000 | Hayashi et al. | 707/501 |
| 6,088,431 A | 7/2000 | LaDue | 379/114.2 |
| 6,157,940 A | 12/2000 | Marullo et al. | 703/27 |
| 6,247,020 B1 | 6/2001 | Minard | 707/104.1 |
| 6,268,851 B1 | 7/2001 | Bricklin et al. | 715/744 |
| 6,275,824 B1 | 8/2001 | O'Flaherty et al. | 707/9 |
| 6,317,777 B1 | 11/2001 | Skarbo et al. | 709/204 |
| 6,397,351 B1 | 5/2002 | Miller et al. | 714/13 |
| 6,457,002 B1 | 9/2002 | Beattie et al. | 707/3 |
| 6,490,601 B1 | 12/2002 | Markus et al. | 715/507 |
| 6,507,856 B1 | 1/2003 | Chen et al. | 715/205 |
| 6,562,076 B2 * | 5/2003 | Edwards et al. | 715/229 |
| 6,571,253 B1 | 5/2003 | Thompson et al. | 707/103 R |
| 6,629,843 B1 | 10/2003 | Bunting et al. | 434/118 |
| 6,731,314 B1 | 5/2004 | Cheng et al. | 715/848 |
| 6,859,821 B1 | 2/2005 | Ozzie et al. | 709/205 |
| 6,865,599 B2 * | 3/2005 | Zhang | 709/218 |
| 6,915,482 B2 | 7/2005 | Jellum et al. | 715/234 |
| 6,920,455 B1 | 7/2005 | Weschler | 707/100 |
| 6,944,622 B1 | 9/2005 | Mitchell et al. | 707/102 |
| 6,944,662 B2 | 9/2005 | Devine et al. | 709/225 |
| 6,950,990 B2 * | 9/2005 | Rajarajan et al. | 715/736 |
| 6,996,769 B1 | 2/2006 | Peikes et al. | 715/205 |
| 7,017,112 B2 | 3/2006 | Collie et al. | 715/513 |
| 7,035,839 B1 * | 4/2006 | Gillespie et al. | 707/2 |
| 7,039,708 B1 | 5/2006 | Knobl et al. | 709/227 |
| 7,039,863 B1 | 5/2006 | Caro et al. | 715/530 |
| 7,085,773 B2 | 8/2006 | Dorsett, Jr. | 707/104.1 |
| 7,111,284 B2 | 9/2006 | Takagi et al. | 717/136 |
| 7,117,504 B2 | 10/2006 | Smith et al. | 719/328 |
| 7,200,816 B2 | 4/2007 | Falk et al. | 715/762 |
| 7,237,002 B1 * | 6/2007 | Estrada et al. | 709/203 |
| 7,340,481 B1 | 3/2008 | Baer et al. | 707/104.1 |
| 7,386,563 B1 | 6/2008 | Pal | 707/102 |
| 7,509,305 B2 | 3/2009 | Tozawa et al. | 707/3 |
| 7,562,342 B2 | 7/2009 | Berg et al. | 717/108 |
| 2001/0056463 A1 | 12/2001 | Grady et al. | 709/203 |
| 2002/0010716 A1 | 1/2002 | McCartney et al. | 707/517 |
| 2002/0013792 A1 | 1/2002 | Imielinski et al. | 707/523 |
| 2002/0065110 A1 | 5/2002 | Enns et al. | 455/566 |
| 2002/0085020 A1 | 7/2002 | Carroll, Jr. | 345/700 |
| 2002/0107867 A1 | 8/2002 | Takagi et al. | 707/102 |
| 2002/0133516 A1 | 9/2002 | Davis et al. | 707/513 |
| 2002/0161801 A1 | 10/2002 | Hind et al. | 707/513 |
| 2002/0198962 A1 | 12/2002 | Horn et al. | 709/218 |
| 2003/0007009 A1 | 1/2003 | Haley | 345/805 |
| 2003/0018666 A1 | 1/2003 | Chen et al. | 707/513 |
| 2003/0018714 A1 | 1/2003 | Mikhailov et al. | 709/203 |
| 2003/0023632 A1 | 1/2003 | Ries et al. | 707/513 |
| 2003/0023953 A1 | 1/2003 | Lucassen et al. | 717/106 |
| 2003/0051054 A1 | 3/2003 | Redlich et al. | 709/246 |
| 2003/0097457 A1 | 5/2003 | Saran et al. | 709/230 |
| 2003/0159111 A1 | 8/2003 | Fry | 715/513 |
| 2003/0163603 A1 | 8/2003 | Fry et al. | 709/328 |
| 2003/0164859 A1 | 9/2003 | Evans | 345/792 |
| 2003/0174162 A1 | 9/2003 | Wu | 345/736 |
| 2004/0021679 A1 | 2/2004 | Chapman et al. | 345/700 |
| 2004/0073565 A1 | 4/2004 | Kaufman et al. | 707/101 |
| 2004/0088332 A1 | 5/2004 | Lee et al. | 707/200 |
| 2004/0088647 A1 | 5/2004 | Miller et al. | 715/234 |
| 2004/0098667 A1 | 5/2004 | Atkinson | 715/513 |
| 2004/0103147 A1 | 5/2004 | Flesher et al. | 709/204 |
| 2004/0111672 A1 | 6/2004 | Bowman et al. | 715/513 |
| 2004/0153467 A1 | 8/2004 | Conover et al. | 707/100 |
| 2004/0183830 A1 | 9/2004 | Cody et al. | 345/752 |
| 2004/0199876 A1 | 10/2004 | Ethier et al. | 715/249 |
| 2004/0205565 A1 | 10/2004 | Gupta | 715/513 |
| 2004/0205653 A1 | 10/2004 | Hadfield et al. | 715/255 |
| 2004/0217985 A9 | 11/2004 | Ries et al. | 345/740 |
| 2004/0220926 A1 | 11/2004 | Lamkin et al. | 770/3 |
| 2004/0225958 A1 | 11/2004 | Halpert et al. | 715/513 |
| 2004/0237036 A1 | 11/2004 | Qulst et al. | 715/236 |
| 2004/0243938 A1 | 12/2004 | Weise et al. | 715/526 |
| 2004/0268240 A1 | 12/2004 | Vincent | 715/234 |
| 2005/0014494 A1 | 1/2005 | Owen et al. | 455/419 |
| 2005/0027618 A1 | 2/2005 | Zucker et al. | 705/26 |
| 2005/0033667 A1 | 2/2005 | Sugimoto et al. | 705/28 |
| 2005/0033766 A1 | 2/2005 | Pang et al. | 707/104.1 |
| 2005/0034079 A1 | 2/2005 | Gunasekar et al. | 715/753 |
| 2005/0044145 A1 | 2/2005 | Quinn et al. | 709/205 |
| 2005/0050066 A1 | 3/2005 | Hughes | 707/100 |
| 2005/0068913 A1 | 3/2005 | Tan et al. | 370/310 |
| 2005/0071477 A1 | 3/2005 | Evans et al. | 709/228 |
| 2005/0076295 A1 | 4/2005 | Simske et al. | 715/517 |
| 2005/0086384 A1 | 4/2005 | Ernst | 709/248 |
| 2005/0091346 A1 | 4/2005 | Krishnaswami et al. | 709/220 |
| 2005/0091576 A1 | 4/2005 | Relyea et al. | 715/502 |
| 2005/0114771 A1 | 5/2005 | Piehler et al. | 715/264 |
| 2005/0154978 A1 | 7/2005 | Albornoz et al. | 715/513 |
| 2005/0183001 A1 | 8/2005 | Carter et al. | 715/501.1 |
| 2005/0187973 A1 | 8/2005 | Brychell et al. | 707/104.1 |
| 2005/0188349 A1 | 8/2005 | Bent et al. | 717/106 |
| 2005/0188350 A1 | 8/2005 | Bent et al. | 717/106 |
| 2005/0289457 A1 | 12/2005 | Obasanjo et al. | 715/513 |
| 2006/0031755 A1 | 2/2006 | Kashi | 715/201 |
| 2006/0036692 A1 | 2/2006 | Morinigo et al. | 709/206 |
| 2006/0041558 A1 | 2/2006 | McCauley et al. | 707/10 |
| 2006/0048112 A1 | 3/2006 | Thiagarajan et al. | 717/144 |
| 2006/0053158 A1 | 3/2006 | Hall et al. | 707/102 |
| 2006/0053194 A1 | 3/2006 | Schneider et al. | 709/204 |
| 2006/0136441 A1 | 6/2006 | Fujisaki | 707/101 |
| 2006/0150085 A1 | 7/2006 | Davis et al. | 715/513 |
| 2006/0195413 A1 | 8/2006 | Davis et al. | 707/1 |
| 2006/0195454 A1 | 8/2006 | Davis et al. | 707/100 |
| 2006/0282452 A1 | 12/2006 | Takagi et al. | 707/101 |
| 2007/0061382 A1 | 3/2007 | Davis et al. | 707/201 |
| 2007/0118554 A1 | 5/2007 | Chang et al. | |

FOREIGN PATENT DOCUMENTS

| | | | |
|---|---|---|---|
| KR | 2004-0034327 A | 4/2004 | |
| WO | WO 01/08033 A2 | 2/2001 | |
| WO | WO 01/11486 A2 | 2/2001 | |
| WO | WO 01/11486 A3 | 2/2001 | |
| WO | WO 01/15004 A2 | 3/2001 | |
| WO | WO 01/95515 A2 | 12/2001 | |
| WO | WO 01/95515 A3 | 12/2001 | |

OTHER PUBLICATIONS

U.S. Office Action dated Mar. 10, 2008 cited in U.S. Appl. No. 10/955,612.

U.S. Office Action dated Mar. 11, 2008 cited in U.S. Appl. No. 11/066,083.

Altova, "xmlspy5: User & Reference Manual," Jan. 3, 2003, www.altova.com, pp. 13-30, 698-701, 890.

U.S. Official Action dated Sep. 19, 2006 cited in U.S. Appl. No. 10/955,612.

U.S. Official Action dated Nov. 22, 2006 cited in U.S. Appl. No. 11/030,423.

U.S. Official Action dated Oct. 4, 2007 cited in U.S. Appl. No. 11/030,423.

Memorandum and four figures regarding StarOffice 5.1; date is unknown, but believed to be earlier than Jan. 5, 2001, 5 pgs.

Habraken, Jr., StarOffice 5.2 Calc Handbook, Prentice Hall, Dec. 2000, Chapter 2, 5 pgs.

U.S. Appl. No. 11/030,423, filed Jan. 6, 2005, entitled "Data Binding in a Word-Processing Application".

U.S. Appl. No. 11/066,058, filed Feb. 25, 2005, entitled "Method and Apparatus for Utilizing an Extensible Markup Language Schema for Managing Specific Types of Content in an Electronic Document".

U.S. Appl. No. 11/066,083, filed Feb. 25, 2005, entitled "Programmability for Binding Data".
U.S. Appl. No. 11/067,383, filed Feb. 25, 2005, entitled "XML Schema for Binding Data".
U.S. Appl. No. 11/066,117, filed Feb. 25, 2005, entitled "Data Store for Software Application Documents".
European Examination Report dated Jun. 12, 2006 cited in European Application No. EP 05105427.8.
McKenzie et al., "XFA Template Version 1.0", http://www.w3.org/1999/05/XFA/xfa-template, retrieved on May 30, 2008, 60 pgs.
Heslop et al., "Word 2003 Bible", Wiley Publishing, 2003, pp. 441-443.
Souchon et al., "A Review of XML-compliant User-Interface Description Languages," LNCS, copyright Springer-Verlag 2003, pp. 377-391.
Meyer, "A Tool-Creating Validated XML Documents on the Fly Using MS Word," SIGDOC, copyright Oct. 2002, ACM, pp. 113-121.
Sara Comai et al., "Computing Graphical Queries Over XML Data," ACM Transactions on Information Systems TOIS, ACM Press, vol. 19, No. 4, Oct. 2001, pp. 371-430.
Leslie, "Using Javadoc and XML to Produce API Reference Documentation," SIGDOC 02, Oct. 23, 2002, ACM Press, pp. 104-109.
Sun et al., "Operational Transformation for Collaborative Word Processing," Proceedings of the Conference of CSCW'04, Nov. 10, 2004, ACM Press, pp. 437-446.
Sun_Micro, "How to Write Doc Comments for the Javadoc Tool," Sep. 2004, pp. 1-16, <Retrieved from web.archive.org Oct. 4, 2008>.
Sala et al., "ML 3.0 Smoothed Aggregation User's Guide," May 2004, Computational Math & Algorithms, Sandia National Laboratories, <Retrieved from http://trilinos.saudia.gov/packages/ml/publications.html on Oct. 3, 2008>.
Narravula et al., "Supporting Strong Coherency for Active Caches in Multi-Tier Data-Centers over InfiniBand," 2004, ANL.gov, pp. 1-10, <Retrieved form CiteseerX May 5, 2009>.
Narravula et al., "Designing Efficient Cooperative Caching Schemes for Multi-Tier Data Centers over RDMA-enabled Networks," Jun. 2005, OCU-CISRC-6/05-TR39, Cover Page, pp. 1-10, <Retrieved from internet May 5, 2009>.
Ladd et al., "Using HTML, 4, XML and Java 1.2", Que, Platinum Edition, Dec. 1998, pp. 693-701.
C. Mascolo et al., "XMiddle: A Data-Sharing Middleware for Mobile Computing," Wireless Personal Communication, Springer, Dordrecht, NL, vol. 21, No. 1, Apr. 1, 2002, pp. 77-103.

* cited by examiner

METHOD AND APPARATUS FOR UTILIZING AN OBJECT MODEL FOR MANAGING CONTENT REGIONS IN AN ELECTRONIC DOCUMENT

CROSS-REFERENCE TO RELATED APPLICATIONS

This patent application is a continuation-in-part application of U.S. patent application Ser. No. 10/955,612 filed Sep. 30, 2004 entitled "Method, System, And Computer-Readable Medium For Managing Specific Types of Content In An Electronic Document," the disclosure of which is expressly incorporated herein, in its entirety, by reference. This patent application is also related to and filed concurrently with U.S. patent application Ser. No. 11/066,083, entitled "Programmability For Binding Data," which is assigned to the same assignee as the present application and expressly incorporated herein, in its entirety, by reference.

BACKGROUND OF THE INVENTION

Modern word processors enable a user to readily create and insert various types of content (e.g., text, pictures, etc.) in an electronic document. In addition, modern word processors enable a user to conform individual types of content to a variety of formats. For example, text may be inserted in a document in paragraph form or as word fragments with different individual formatting properties (e.g., bold, italic, underline, font color, font size) or with no formatting at all. The freeform entry of content allowed by modern word processors, however, suffers from several drawbacks.

One drawback associated with content entry with many modern word processors is that it is often difficult for a user to readily insert, identify, and manipulate regions of the document or template which require different types of content (e.g., a specific fragment of text or a picture) in a document without either manually typing the content in or scanning another document, finding and manually selecting the location for the desired content, and then creating or moving the desired content from another location in the document to the desired location. Even if a predefined set of document fragments (i.e., content blobs) are available for insertion into the document, the document cannot express which pieces of content are valid in any specific location, other than by including static informational text which the user must read, understand, and voluntarily adhere to. Since conventional word processors do not label the locations where the different types of content (predefined or not) may be inserted in an electronic document, they do not permit a user to quickly identify the locations of interest for the insertion of specific content.

It is with respect to these considerations and others that the various embodiments of the present invention have been made.

BRIEF SUMMARY OF THE INVENTION

In accordance with the present invention, the above and other problems are solved by a method and apparatus for utilizing a document object model to manage content regions for use in an electronic document. A content region is a predefined area which may be inserted in an electronic document and which serves as a placeholder for receiving and displaying specific types of content such as text, graphics data, calendar data, or tabular data. The document object model enables a user to create, modify, and delete content regions from an electronic document using an application programming interface from within a programming environment such as a word processing application program.

According to one aspect of the invention, a method is provided for utilizing an object model for managing content regions for displaying specific types of content in an electronic document. The method includes providing in the object model a group of objects which include properties, methods, and events, exposing an application programming interface in the object model for accessing the objects, and utilizing the properties, methods, and events in the object model to manage the content regions. The properties in the object model allow a user to set the behaviors of objects corresponding to content regions which may be used in the electronic document. Utilizing the properties a user may set a date format for a content region for displaying a date, set a document part category associated with a content region for displaying document parts, set a first locking behavior for restricting the deletion of a content region, set a second locking behavior for restricting the deletion of the contents of a content region, set a picture format for a content region for displaying pictures, set a title for a content region, and set a content region type. A user may also utilize a property to return a current validation status of a content region.

The methods in the object model allow a user to perform specified actions with respect to content regions which may be used in an electronic document. A user may call one or more methods to add a content region around a specified range in the electronic document, copy a content region from a first location in the electronic document for insertion in a second location in the electronic document, delete a content region from the electronic document, set placeholder text for a content region, set a custom validation error for a content region, reorder the dropdown list, cut the content region, add a new item to a dropdown list for a predetermined content region, and remove all of the dropdown entries from a dropdown list. In calling the methods the user may select one or more parameters for performing a specified action.

The events in the object model are generated by the application programming interface in response to an action related to a content region. The application programming interface may fire one or more events in response to a user-selection inside of a content region in the electronic document, in response to a user-selection outside of a content region in the electronic document, and in response to the creation and deletion of content regions in the electronic document. A user may configure the events to fire based on one or more selected parameters.

The method further includes validating the properties against one or more predetermined types of content regions. The method further includes validating the called methods against one or more of the properties set for a content region. The method further includes providing enumeration objects, the enumeration objects representing possible values for the properties in the object model.

The invention may be implemented as a computer process, a computing system, or as an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features, as well as advantages, which characterize the present invention, will be apparent from a reading of the following detailed description and a review of the associated drawings.

DETAILED DESCRIPTION OF THE INVENTION

Figure 1:
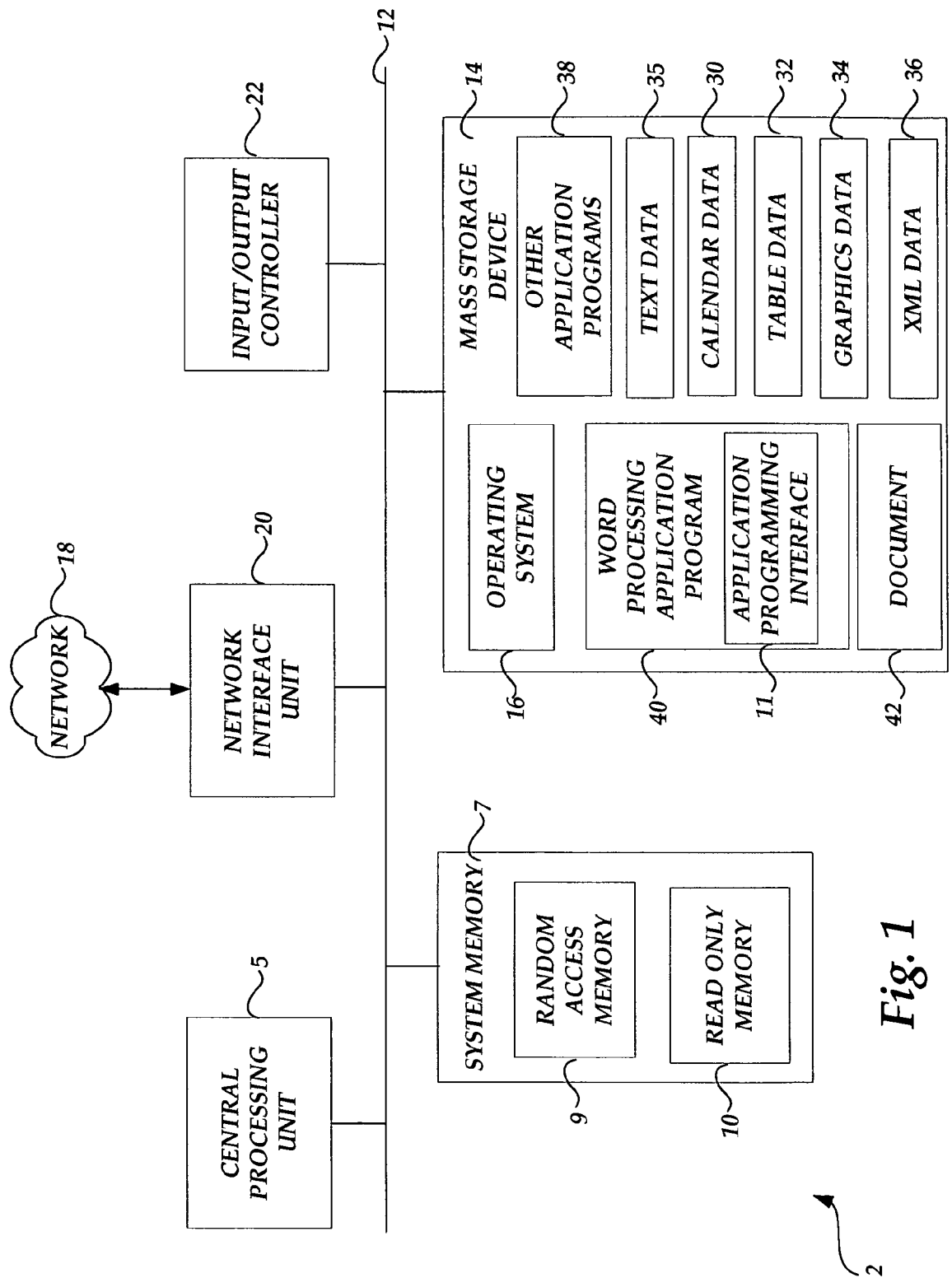
FIG. 1 is a computer system architecture diagram illustrating a computer system utilized in and provided by the various embodiments of the invention.

Referring now to the drawings, in which like numerals represent like elements, various aspects of the present invention will be described. In particular, FIG. 1 and the corresponding discussion are intended to provide a brief, general description of a suitable computing environment in which embodiments of the invention may be implemented. While the invention will be described in the general context of program modules that execute in conjunction with program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 1, an illustrative computer architecture for a computer 2 utilized in the various embodiments of the invention will be described. The computer architecture shown in FIG. 1 illustrates a conventional desktop or laptop computer, including a central processing unit 5 ("CPU"), a system memory 7, including a random access memory 9 ("RAM") and a read-only memory ("ROM") 10, and a system bus 12 that couples the memory to the CPU 5. A basic input/output system containing the basic routines that help to transfer information between elements within the computer, such as during startup, is stored in the ROM 10. The computer 2 further includes a mass storage device 14 for storing an operating system 16, application programs, and other program modules, which will be described in greater detail below.

The mass storage device 14 is connected to the CPU 5 through a mass storage controller (not shown) connected to the bus 12. The mass storage device 14 and its associated computer-readable media provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed by the computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 2.

According to various embodiments of the invention, the computer 2 may operate in a networked environment using logical connections to remote computers through a network 18, such as the Internet. The computer 2 may connect to the network 18 through a network interface unit 20 connected to the bus 12. It should be appreciated that the network interface unit 20 may also be utilized to connect to other types of networks and remote computer systems. The computer 2 may also include an input/output controller 22 for receiving and processing input from a number of other devices, including a keyboard, mouse, or electronic stylus (not shown in FIG. 1). Similarly, an input/output controller 22 may provide output to a display screen, a printer, or other type of output device.

As mentioned briefly above, a number of program modules and data files may be stored in the mass storage device 14 and RAM 9 of the computer 2, including an operating system 16 suitable for controlling the operation of a networked personal computer, such as the WINDOWS XP operating system from MICROSOFT CORPORATION of Redmond, Wash. The mass storage device 14 and RAM 9 may also store one or more program modules. In particular, the mass storage device 14 and the RAM 9 may store a word processing application program 40. As known to those skilled in the art, the word processing application program 40 is operative to provide functionality for creating and editing electronic documents, such as document 48. According to one embodiment of the invention, the word processing application program 40 comprises the WORD word processing application program from MICROSOFT CORPORATION. It should be appreciated, however, that word processing application programs from other manufacturers may be utilized to embody the various aspects of the present invention. It should further be appreciated that the various aspects of the present invention are not limited to word processing application programs but may also utilize other application programs 38 which are capable of processing various forms of content (e.g. text or pictures), such as spreadsheet application programs.

In conjunction with the editing of a word processing document, the word processing application program 40 provides functionality for allowing a user to insert specific types of content into various locations in the document 42, called "content regions." For instance, according to embodiments of the invention, a user may utilize an interactive content pane generated by the word processing application program 40 which includes a content region and serves as a placeholder for inserting text such as a paragraph for the "Objective" section of a resume in the document 42. A user may utilize other interactive content panes generated by the word processing application program 40 for inserting text (which may be arbitrarily restricted by the document's author), a date 30, a table 32, or graphics data 34 (i.e., pictures) into content regions. Alternatively, a user may also define customized content as one of a set of "document parts" which may be inserted into the content region of an interactive content pane. As defined herein, document parts are preformatted structural elements or layouts which add structure to documents. Document parts may include cover pages, mathematical equations, indexes and tables (e.g., Table of Contents, Table of Figures, and Table of Authorities), page headers and footers, pages and sections (e.g., blank pages and two-column pages), personal contact information (e.g., name and address information), images, tables, and watermarks. Document parts are described in greater detail in U.S. patent application Ser. No. 10/955,622, entitled "Method, System, And Computer-Readable Medium For Creating, Inserting, And Reusing Document Parts In An Electronic Document," the disclosure of which is incorporated herein, in its entirety, by reference.

It should be appreciated that the word processing application program 40 may utilize interactive content panes to restrict the specific types of content which may be entered into the document 42. According to various embodiments of the invention, the word processing application program 40 is also operative for generating interactive content panes which serve as bindings between areas of the document 42 and an external data source, such as Extensible Markup Language ("XML") data 36. According to still other embodiments of the invention, the word processing application program 40 (or other text processing application program) may utilize an XML schema comprising structural elements for defining a content region for displaying content in the document 42.

The word processing application program 40 also includes an application programming interface ("API") 11 which provides an object model interface for providing all of the functionality of the word processor's user interface, via code. As is known to those skilled in the art, object models are used in software applications to provide a way for code to automate tasks that a user may perform through a user interface of an application, such as the word processing application program 40. The object model allows code to be written which, for example, automates repetitive tasks for the user and reacts to (e.g., validates, etc.) actions by the user. The API 11 provides structures which provide code access to equivalents of all of the paradigms/user interfaces of the word processing application program 40. These structures are organized into four basic categories:

Objects: Structures which correspond to actionable objects within an application.

Methods: Actions that can be performed on an object (e.g., insert, add, or delete).

Properties: Things that can be set about an object (e.g., the name of a content region).

Events: Actions in response a user's (or code's) interaction with an application.

It will be appreciated that any object within an object model can include methods, properties, and/or events which allow code to manipulate that object. According to one embodiment of the invention, the word processing application program 40 comprises the WORD word processing application program from MICROSOFT CORPORATION. It should be appreciated, however, that word processing application programs from other manufacturers may be utilized to embody the various aspects of the present invention. It should further be appreciated that the various aspects of the present invention are not limited to word processing application programs but may also utilize other application programs which are capable of processing text.

The object model which may be utilized with the various embodiments of the invention may include the following objects, methods, properties, and events:

ContentRegions—This is an object which represents a group of content regions which may be used in an electronic document.

.Add([Type As ContentRegionType], [Range As Range]) As ContentRegion—This is a method which may be utilized to add a new content region around a specified range (e.g., text) in an electronic document. It will be appreciated that this method may include the Type parameter ContentRegionType which is a constant that specifies one of the available types of content regions which may be inserted into the electronic document. If the Type parameter is not specified, the method will insert a default content region type (i.e., Rich Text) in this parameter. The method may also include a Range object which specifies the location in the electronic document where the new content region should be supplied. If the Range object is not specified, then a current selection in the electronic document is implied.

.Count As Long [read-only]—This is a property which returns a Long (i.e., an integer) representing the number of content regions in the ContentRegions object.

.Item(Index As Variant) As ContentRegion—This is a property which returns a ContentRegion object corresponding to a requested content region. It will be appreciated that this property includes an Index parameter which is a Variant representing the desired item from the collection of content regions in the ContentRegions object. The Variant may be an Integer representing the index of the desired content region in the collection or a String representing the title of the desired content region in the collection. If more than one content region shares the same name, then this property will return the first one in the collection with that name.

ContentRegion—This is an object representing a single content region in an electronic document.

.Copy As Void—This is a method which copies the entire content region so that the entire content region can be inserted in another location in the electronic document.

.Cut As Void—This is a method which cuts the entire content region so that the entire content region can be inserted in another location in the electronic document.

.Delete([DeleteContents As Boolean=False]) As Void—This is a method which deletes the current content region from an electronic document, with or with its contents. The method includes the parameter DeleteContents which is a Boolean value specifying whether the content region should be deleted, leaving the surrounding text (Boolean=False) or whether the content region and its contents should be deleted (Boolean=True). If this method is called for a content region which is "locked" (i.e., set to be undeletable and/or uneditable), the call fails with an error message (e.g., "This content region is locked and cannot be deleted").

.DropdownListEntries As ContentRegionListEntries [read-only]—This is a property which returns a ContentRegionListEntries object (described below) that represents the dropdown list entries for the content region of type ContentRegionDropdownList (described below) or ContentRegionCombobox (described below). If this property is called for a content region which not a Dropdown list or a combo box, the call fails with an error message (e.g., "This property can only be used with drop down list or combo box content regions"). It should be understood that a combo box is a content region may contain multiple content types (e.g., a dropdown list and rich text).

.DataBinding As DataBinding [read-only]—This is a property which returns a DataBinding object that allows the developer to get/set the data binding information for this content region (Data binding objects are discussed in greater detail in co-pending U.S. patent application Ser. No. 11/066,083, entitled "Programmability For Binding Data," which is assigned to the same assignee as the present application and expressly incorporated herein, in its entirety, by reference).

.DateDisplayFormat As String—This is a property which gets/sets a string representing the date format of a content region for receiving "date" data (e.g., dddd, MMMM dd, yyyy=Monday, Dec. 6, 2004). This property defaults to the default date format of the system. If this property is called using an invalid string, the call fails with an error message (e.g., "This is not a valid date format"). If this property is called for a content region which is not a "date type" content region, then the call also fails with an error message (e.g., "This property can only be used with date content regions").

.DateXMLDataFormat as ContentRegionDateXMLDataFormat—This is a property which gets/sets a date in an XML data format. If this property is called for a content region which is not a "date type" content region, then the call also fails with an error message (e.g., "This property can only be used with date content regions").

.DocumentPartCategory As String—This property gets/sets the document part category associated with a current content region for receiving a document part. If this property is called for a content region which is not a document part, the call fails with an error message (e.g., "This property can only be used with document part content regions.")

.LockContentRegion As Boolean—This is a property which returns a Boolean value which can be used to turn on/off locking of the content region (i.e., whether the content region itself can be deleted via an editing pane in a user interface).

.LockContents As Boolean—This is a property which returns a Boolean value which can be used to turn on/off 'content' locking of the content region (i.e., whether the content region's contents can be edited via the editing pane in a user interface).

.PictureFormat as ContentRegionPictureFormat—This is a property which gets/sets the picture format for a picture content region. If the content region is not of this type, the property call fails with an error message (e.g., "This property can only be used with picture content regions").

.PlaceholderText As AutoTextEntry [read-only]—This is a property which gets the placeholder text for the current content region.

.Range As Range [read-only]—This is a property which returns a range that represents the contents of the current content region.

.SetPlaceholderText([DocumentPart as AutoTextEntry],[Range as Range],[Text as String]) As Void— This is a method which sets the placeholder text for a specific content region. Parameters for this method include: DocumentPart, which is an AutoTextEntry object representing a document part which should be used for the placeholder text; Range, which is an object representing a range which should be converted into the placeholder text; and Text, which is a String representing the desired placeholder text. It will be appreciated that if multiple parameters are provided the AutoTextEntry will be used before the Range parameter which will in turn be used before the Text parameter.

.SetValidationError(ErrorText As String, [ClearedAutomatically As Boolean=True]) As Void—This is a method which allows a user to set a custom validation error on a content region. For instance, this method may be used to set a custom validation error which will appear when the user enters the data binding to a XML node in an electronic document. The method includes the following parameters: ErrorText, which is a String representing the custom error text that the user wants to have appear in the error user interface (i.e., a notification region) for the content region; and ClearedAutomatically, which is a Boolean value indicating whether the custom error should be automatically removed (cleared) the next time the contents of the content region are changed, or if the error should remain until it is manually removed by the user.

.Title As String—This is a property which gets/sets the title for an individual content region. This call for this property may generate an error message if the String exceeds a predetermined length for the title (e.g., "The title for this content region cannot exceed 32 characters").

.Type as ContentRegionType—This is a property which gets/sets the 'type' of the content region (according to the valid list of types in the enumeration for the object model—e.g. dropdown, combo box, picture).

.ValidationStatus As XMLValidationStatus [read-only]—This is a property which returns the current validation status of the content region (or underlying XML node if it is data bound).

.BeforeStoreUpdate(ContentRegion As ContentRegion, Content As String)—This is an event which fires whenever a XML node pushes data to a document object model (DOM). This event includes a Content Region parameter which represents the content region which is pushing data to a data store and a Content parameter which is a String that represents the contents being pushed to the data store.

.BeforeContentUpdate(ContentRegion As ContentRegion, Content As String)—This is an event which fires whenever the XML node retrieves data from the DOM. This event includes the ContentRegion and Content parameters discussed above.

.OnEnter(ContentRegion As ContentRegion)—This is an event which fires whenever a user clicks/cursors the selection inside of the current content region in the electronic document. This event includes a Content Region parameter representing the content region which was just entered.

.OnExit(ContentRegion As ContentRegion, Cancel as Boolean)—This is an event which fires whenever the user clicks/cursors the selection outside of the current content region in the document. This event includes a ContentRegion parameter representing the content region which was just entered and a Cancel parameter, which is a Boolean value indicating whether a user can leave the range or not. (e.g., if Boolean=True, the user is prevented from exiting the range, that is the insertion point is pushed back into the range).

ContentRegionListEntries—This is an object representing a collection of the dropdown entries for a dropdown or combo box content region.

.Add(Text As String, [Value As String], [Index As Long]) As ContentRegionListEntry—This is a method which adds a new item to a dropdown list at the specified index if the content region parent is a dropdown list or a combo box. If not, the method call returns an error (e.g., "This method can only be used with dropdown list or combo box content regions"). This method includes a Text parameter which is a String representing the contents of the list entry which should be displayed in the user interface, a Value parameter which is a String representing the contents of the list entry which should be pushed to the corresponding data bound XML node (if one exists), and an Index parameter which is a Long representing the desired location of the entry in the list. It will be appreciated that if an entry already exists at the specified index, the other entries are moved down in the list to accommodate the new entry.

.Clear As Void—This is a method which removes all of the dropdown entries from the list.

.Count As Long [read-only]—This is a property which returns a Long representing the total number of entries in the dropdown list.

.Item(Index As Long) As ContentRegionListEntry— This is a property which returns the specified Content RegionListEntry from the collection. The property includes the Index parameter which is a Long representing the desired item in the collection.

ContentRegionListEntry—This is an object representing a single entry in a dropdown list content region.

.Delete As Void—This is a method which deletes the entry from the dropdown list. It will be appreciated that if the entry is supplied by an associated with an XML schema, the entry may not be deleted.

.Text As String—This is a property which gets/sets the text that is displayed in the dropdown for this entry. It will be appreciated that if the entry is supplied by an associated with an XML schema, the entry may not be changed.

.Index As Long—This is a property which gets/sets the index of this entry in the list. If the index that is set is already occupied, all further entries are pushed down to accommodate it. If the index is past the end of the list the entry is placed as the last position in the list).

.MoveUp As Void—This is a method which moves the current entry up one spot in the list.

.MoveDown As Void—This is a method which moves the current entry down one spot in the list.

.Value As String—This is a property which gets/sets the text that is sent to the corresponding data store XML node (if bound) when this entry is chosen via the user interface. It will be appreciated that if the entry is supplied by an associated with an XML schema, the entry may not be changed.

The object model discussed above may also include a group of enumerations for assigning named constants (i.e., values) to the properties defined in the object model.

The enumerations are listed below:

ContentRegionDateXMLDataFormat—Contains an enumeration of the date formats which can be used for storing the contents of a date content region.

ContentRegionDateXMLDataFormatDateTime—Represents a date content region where the date should be transformed to XML before being pushed to a data store.

ContentRegionDateXMLDataFormatSameAsDisplay—Represents a date content region where the date should pushed to a data store as displayed (no transformation).

ContentRegionPictureFormat—Contains an enumeration of the picture formats for storing a picture content region.

ContentRegionPictureFormatEmbed—Represents a picture content region where the picture will be stored inline in XML (or inline in an XML data store if bound).

ContentRegionPictureFormatLink—Represents a picture content region where the picture will be stored as a reference.

ContentRegionType—Contains an enumeration of the types of content regions which can be added to a document.

ContentRegionDate—Represents a date content region.

ContentRegionDocumentPartGallery—Represents a document part content region.

ContentRegionDropdownList—Represents a dropdown list content region.

ContentRegionComboBox—Represents a combo box content region.

ContentRegionPicture—Represents a picture content region.

ContentRegionRichText—Represents a rich text content region.

ContentRegionText—Represents a plain text content region.

Figure 2:
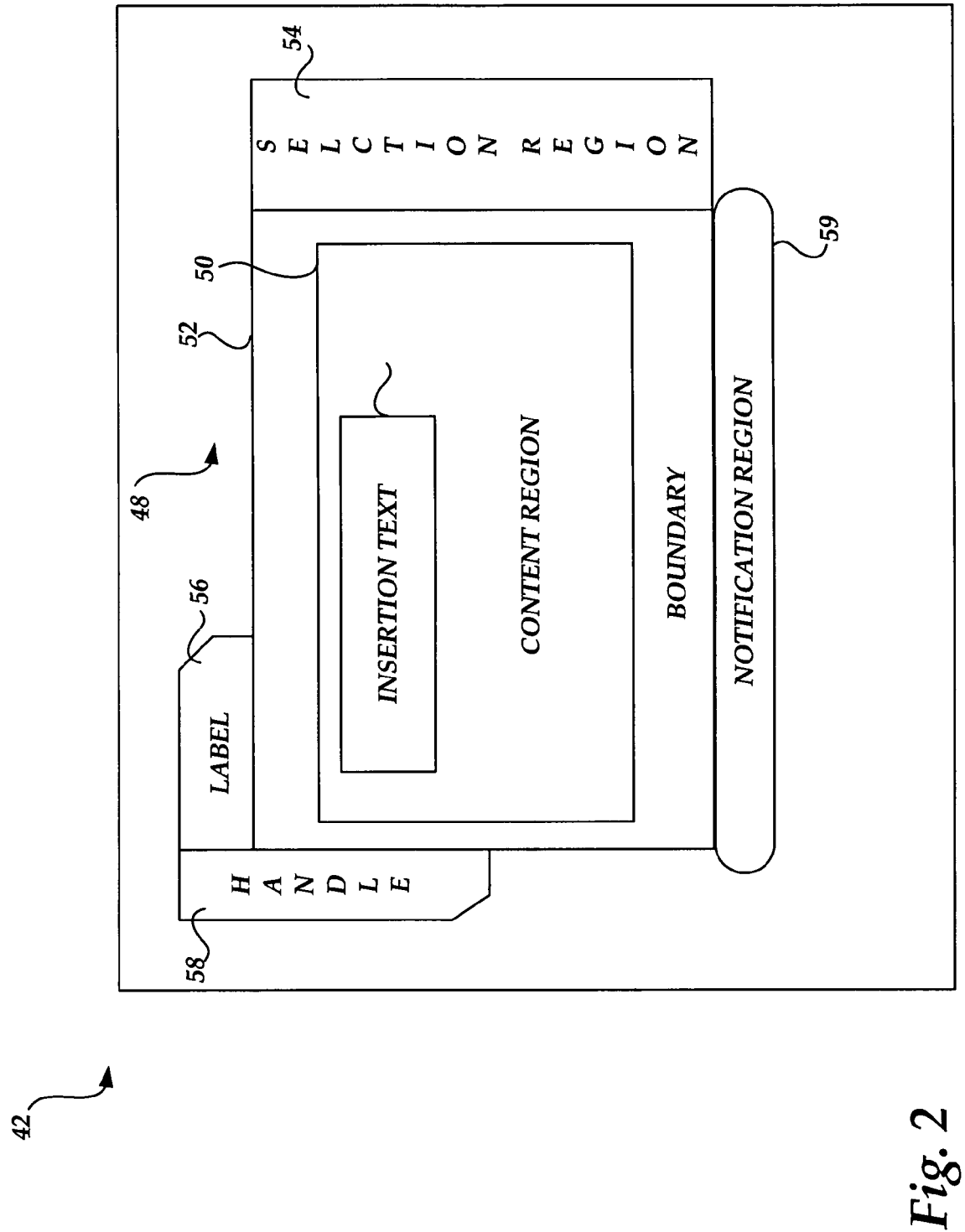
FIG. 2 is a block diagram of an interactive content pane which includes a content region according to an illustrative embodiment of the invention.

Referring now to FIG. 2, an interactive content pane 48 is shown according to an illustrative embodiment of the present invention. The interactive content pane 48 includes a content region 50 for receiving and displaying specific types of content (e.g., text, graphics data, calendar data, or table data) in the document 42. The content region 50 includes a place for instructional text 62 which provides instructions for inserting specific content whenever the content region is empty. For instance, a content region for inserting an "Objective" paragraph in a resume document may include instructional text such as "Please insert your objective paragraph here." It will be appreciated that the instructional text may be tailored to the specific content to be received in the content region of an interactive content pane. For instance, a graphics data or picture content region may include instructional text such as "Insert your photo here." It should be understood that once a user clicks in the content region 50 containing the instructional 62, the instructional text disappears to allow the user to insert the specific content.

As shown in FIG. 2, the interactive content pane 48 also includes a boundary 52, a selection region 54, a label 56, a handle 58, and a notification region 59. The boundary 52 defines limits for the content region 50 for receiving and displaying the specific type of content. In one illustrative embodiment, the boundary 52 may fix the area of the content region 50 to a specific size. For instance, the content region for a single paragraph interactive content pane may be limited to fifteen lines of text. Once this limit is reached, no further text is permitted to be entered into the content region.

The selection region 54 is a user interface for selecting specific types of content from similar content, for display in the content region 50. For instance, a selection region in an interactive content pane for inserting calendar data may include a user interface for selecting a date from a calendar for insertion in a document. The selection region 54 may also display a user with choices from a list of predefined items in a dropdown list, for example. It will be appreciated that in one illustrative embodiment, the user interface in the selection region 54 may automatically be generated when a user clicks in the content region of certain types of interactive content regions. For instance, a user clicking into an interactive content region defined for inserting calendar data may automatically generate a calendar user interface for a user to select a specific date.

The label 56 identifies the specific type of content (e.g., dates) which may be entered into the content region 50. The handle 58 is utilized to "drag" the interactive content region 48 to different areas of a displayed document. The notification region 59 is utilized to communicate messages to a user. It should be understood that the word processing application program 40 includes functionality for validating specific content entered into the content region 50. Thus, the notification region 59 may communicate error messages when content received in the content region does not correspond to the specific type of content for an interactive content pane or when the specific type of content received in the content region exceeds a predefined content restriction (e.g., the number of lines or characters in a paragraph).

Figure 3:
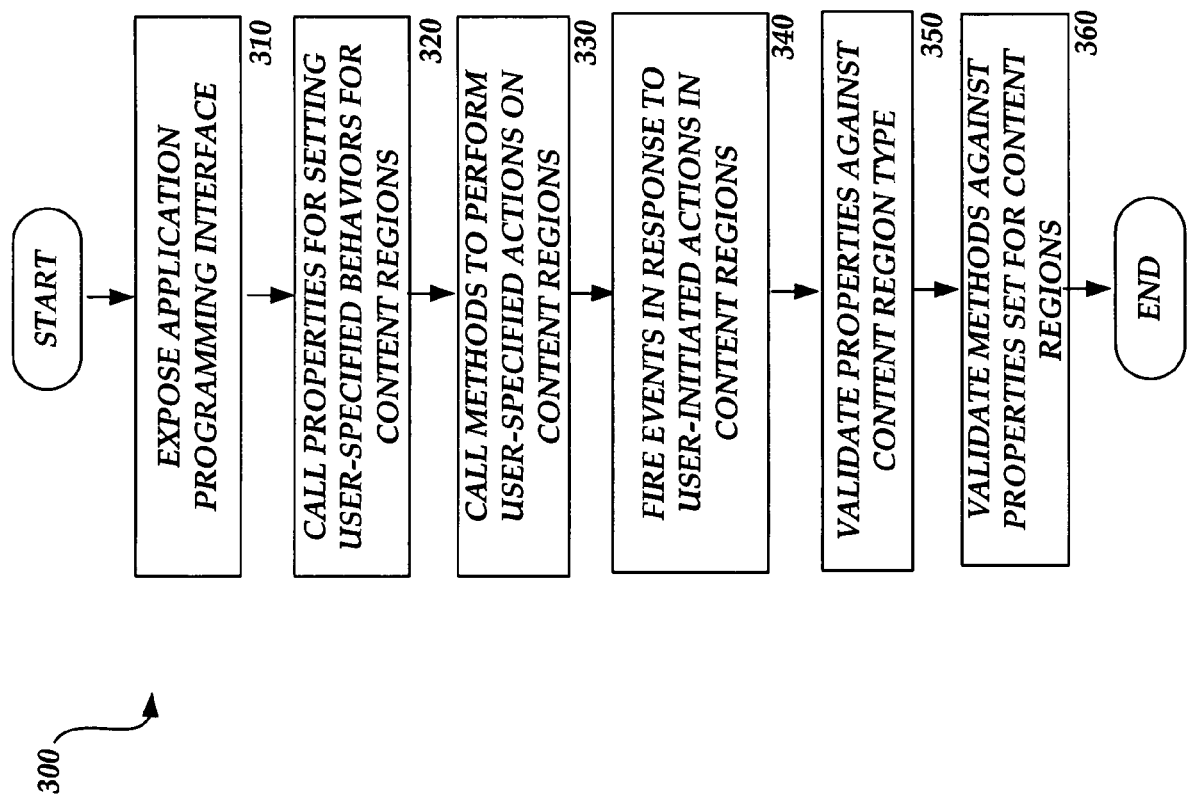
FIG. 3 is an illustrative routine performed by a word processing application program in the computer system of FIG. 1 for utilizing an object model to manage content regions in an electronic document, according to an illustrative embodiment of the invention.

Referring now to FIG. 3, an illustrative routine 300 will be described illustrating a process performed by the word processing application program 10 for utilizing an object model to manage content regions in an electronic document. It should be appreciated that although the embodiments of the invention described herein are presented in the context of the word processing application program 10, the invention may be utilized in other types of application programs that support text processing.

When reading the discussion of the routines presented herein, it should be appreciated that the logical operations of various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated in FIG. 3, and making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims set forth herein.

Referring now to FIG. 3, the routine 300 begins at operation 310, wherein the word processing application program 10 exposes the API 11 which allows a user to manage objects corresponding to content regions by calling the properties and methods in the object model discussed above. The routine 300 continues from operation 310 at operation 320 where the API 11 receives calls for call properties for setting user-specified behaviors for content regions. In particular, a user may utilize properties to set a string representing a date format for a content region for displaying a date, set a document part category associated with a content region for displaying document parts, set a locking behavior for restricting the deletion of a content region, set a locking behavior for restricting the deletion of the contents of a content region, set a picture format for a content region for displaying pictures, set a title for a content region, set a content region type (e.g., data, combo box, picture, text, etc.), and return a current validation status of a content region.

The routine 300 continues from operation 320 at operation 330 where the API 11 receives calls for methods to perform user-specified actions on content regions. In particular, a user may call methods to add a content region around a specified range in the electronic document, copy a content region from a first location in the electronic document for insertion in a second location in the electronic document, set placeholder text for a content region, set a custom validation error for a content region, add a new item to a dropdown list for a predetermined content region (i.e., a dropdown list or combo box content region), remove all of the dropdown entries from a dropdown list in a content region, reorder the dropdown list, and cut a content region from the electronic document. It will be appreciated that in calling the methods to perform user-specified actions, a user may set one or more parameters for each method (if provided in the object model).

The routine 300 continues from operation 330 at operation 340 where the API 11 fire events in response to user-initiated actions in content regions. In particular, an event may be fired in response to a user-selection inside of a content region in the electronic document, in response to a user-selection outside of a content region in the electronic document, in response to the insertion of a content region in the electronic document, or in response to the deletion of a content region in the electronic document. It will be appreciated that a user may set one or more parameters for each event (if provided in the object model). For instance, a user may set the OnExit event to "True" to prevent a user from exiting a range within a content region. Thus, when a user attempts to move an insertion point outside of the content region the event will fire and the insertion point is pushed back into the content region.

The routine 300 continues from operation 340 at operation 350 where the API 11 validates any properties against a content region type. For instance, if a user attempts to set a property to assign a picture format for a non-picture content region, the property call will fail and the API 11 will generate an error message (e.g., "This property can only be used with picture content regions"). The routine 300 continues from operation 350 at operation 360 where the API 11 validates any validate methods against properties set for content regions. For instance, if a user attempts to call a method for adding a dropdown list item to a content region which is not a dropdown list or a combo box, the method call will fail and the API 11 will generate an error message (e.g., "This method can only be used with dropdown list or combo box content regions"). The routine 300 then ends.

Based on the foregoing, it should be appreciated that the various embodiments of the invention include a method and apparatus for utilizing a document object model in an application program to manage content regions for displaying specific types of content in an electronic document. The above specification, examples and data provide a complete description of the manufacture and use of the composition of the invention. Since many embodiments of the invention can be made without departing from the spirit and scope of the invention, the invention resides in the claims hereinafter appended.

We claim:

1. A method for utilizing an object model in an application program for managing a plurality of content regions for displaying specific types of content in an electronic document, the method comprising:
providing a plurality of objects in the object model, wherein the plurality of objects comprises a plurality of properties, a plurality of methods, and a plurality of events each functionally associated with the plurality of content regions;
exposing an application programming interface (API) in the object model for accessing the plurality of objects, wherein exposing the API in the object model for accessing the plurality of objects comprises providing an interactive content pane for managing content regions, each content region being operative to provide an interactive region corresponding to a specific type of content for entering the specific type of content into each content region;
providing a dropdown list corresponding to the plurality of objects, the dropdown list comprising entries associated with the plurality of properties, the plurality of methods, and the plurality of events;
receiving a selection of a first entry in the dropdown list, the first entry being associated with adding at least one content region, wherein adding the at least one content region comprises adding the at least one content region based on at least one parameter and at least one object for specifying the at least one content region, the at least one parameter corresponding to the specific type of content associated with the at least one content region and the at least one object corresponding to a location for adding the at least one content region;
adding the at least one content region;
receiving a selection of a second entry in the dropdown list; and
utilizing, in response to receiving the selection of the second entry, one of the plurality of properties, the plurality of methods, and the plurality of events associated with the second entry to manage the at least one content region.

2. The method of claim 1, wherein utilizing, in response to receiving the selection of the second entry, the plurality of properties comprises:
utilizing a first property to set a string representing a date format for the at least one content region for displaying a date;
utilizing a second property to set a document part category associated with the at least one content region for displaying document parts;
utilizing a third property to set a locking behavior for restricting deletion of the at least one content region;
utilizing a fourth property to set a locking behavior for restricting deletion of a contents of the at least one content region;
utilizing a fifth property to set a picture format for the at least one content region for displaying pictures;
utilizing a sixth property to set a title for the at least one content region; and
utilizing a seventh property to set the specific type of content associated with the at least one content region.

3. The method of claim 2, further comprising validating the plurality of properties against at least the specific type of content associated with the at least one content region.

4. The method of claim 3, wherein the utilizing the properties further comprises utilizing an eighth property to return a current validation status of the at least one content region.

5. The method of claim 1, wherein utilizing, in response to receiving the selection of the second entry, the plurality of methods comprises:
calling a first method to add an additional content region around a specified range in the electronic document;
calling a second method to copy the at least one content region from a first location in the electronic document for insertion in a second location in the electronic document;
calling a third method to delete the at least one content region from the electronic document;
calling a fourth method to set placeholder text for the at least one content region;
calling a fifth method to set a custom validation error for the at least one content region;
calling a sixth method to add a new item to the dropdown list for the at least one content region;
calling a seventh method for removing all dropdown entries from the dropdown list;
calling an eighth method to reorder the dropdown list; and
calling a ninth method to cut the at least one content region from the electronic document.

6. The method of claim 5, further comprising validating the plurality of methods against at least one of the plurality of properties set for the at least one content region.

7. The method of claim 1, wherein utilizing, in response to receiving the selection of the second entry, the plurality of events comprises:
firing a first event in response to a user-selection inside of the at least one content region in the electronic document;
firing a second event in response to a user-selection outside of the at least one content region in the electronic document;
firing a third event in response to a insertion of the at least one content region in the electronic document; and firing a fourth event in response to a deletion of the at least one content region in the electronic document.

8. The method of claim 1, further comprising providing a plurality of enumeration objects, the enumeration objects representing possible values for the plurality of properties in the object model.

9. The method of claim 1, wherein utilizing the plurality of methods further comprises setting at least one parameter.

10. The method of claim 1, wherein utilizing the plurality of events comprises setting at least one parameter.

11. A computer-readable storage medium having a set of instructions which, when executed performs a method for utilizing an object model in a word processing application program for managing a plurality content regions for displaying specific types of content in an electronic document, the method executed by the set of instructions comprising:
providing a plurality of objects in the object model, wherein the plurality of objects comprises a plurality of properties, a plurality of methods, and a plurality of events each functionally associated with the plurality of content regions;
exposing an application programming interface (API) in the object model for accessing the plurality of objects, wherein exposing the API in the object model for accessing the plurality of objects comprises exposing an interactive content pane comprising: at least one content region and a selection region for the at least one content region within the interactive content pane;
receiving a selection of the selection region for the at least one content region;

providing, in response to the selection of the selection region for the at least one content region, a dropdown list corresponding to the plurality of objects, the dropdown list of the plurality of objects comprising entries associated with the plurality of properties, the plurality of methods, and the plurality of events;

receiving a selection of a first entry in the dropdown list, the first entry being associated with adding at least one content region, wherein adding the at least one content region comprises adding the at least one content region based on at least one parameter and at least one object for specifying the at least one content region, the at least one parameter corresponding to a specific type of content associated with the at least one content region and the at least one object corresponding to a location for adding the at least one content region;

adding the at least one content region in accordance with the at least one parameter and the at least one object;

receiving a selection of second entry in the drop down list; and utilizing, in response to receiving the selection of the second entry, one of the plurality of properties, the plurality of methods, and the plurality of events associated with the second entry to manage the selected at least one content region.

12. The computer-readable storage medium of claim 11, wherein utilizing, in response to receiving the selection of the second entry, the plurality of properties comprises:

utilizing a first property to set a string representing a date format for the selected at least one content region for displaying a date;

utilizing a second property to set a document part category associated with the selected at least one content region for displaying document parts;

utilizing a third property to set a locking behavior for restricting deletion of the selected at least one content region;

utilizing a fourth property to set a locking behavior for restricting deletion of a contents of the selected at least one content region;

utilizing a fifth property to set a picture format for the selected at least one content region for displaying pictures;

utilizing a sixth property to set a title for the selected at least one content region; and utilizing a seventh property to set the specific type of content associated with the selected at least one content region.

13. The computer-readable storage medium of claim 12, further comprising validating the plurality of properties against at least the specific type of content associated with the selected at least one content region.

14. The computer-readable storage medium of claim 13, wherein the utilizing the properties further comprises utilizing an eighth property to return a current validation status of the selected at least one content region.

15. The computer-readable storage medium of claim 11, wherein utilizing, in response to receiving the selection of one the second entry, the plurality of methods comprises:

calling a first method to add an additional content region around a specified range in the electronic document;

calling a second method to copy the selected at least one content region from a first location in the electronic document for insertion in a second location in the electronic document;

calling a third method to delete the selected at least one content region from the electronic document;

calling a fourth method to set placeholder text for the selected at least one content region;

calling a fifth method to set a custom validation error for the selected at least one content region;

calling a sixth method to add a new item to the dropdown list for the selected at least one content region;

calling a seventh method for removing all dropdown entries from the dropdown list;

calling an eighth method to reorder the dropdown list; and calling a ninth method to cut the selected at least one content region from the electronic document.

16. The computer-readable storage medium of claim 15, further comprising validating the plurality of methods against at least one of the plurality of properties set for the selected at least one content region.

17. The computer-readable storage medium of claim 11, wherein utilizing, in response to receiving the selection the second entry, the plurality of events comprises:

firing a first event in response to a user-selection inside of the selected at least one content region in the electronic document;

firing a second event in response to a user-selection outside of the selected at least one content region in the electronic document;

firing a third event in response to a insertion of the selected at least one content region in the electronic document; and firing a fourth event in response to a deletion of the selected at least one content region in the electronic document.

18. The computer-readable storage medium of claim 11, further comprising providing a plurality of enumeration objects, the enumeration objects representing possible values for the plurality of properties in the object model.

19. The computer-readable storage medium of claim 11, wherein utilizing the plurality of methods comprises setting at least one parameter and utilizing the plurality of events comprises setting the at least one parameter.

20. A method for managing content regions within an electronic document, the method comprising:

providing a plurality of objects in the object model, wherein the plurality of objects comprises a plurality of properties, a plurality of methods, and a plurality of events each functionally associated with the plurality of content regions;

exposing an application programming interface (API) in the object model for accessing the plurality of objects, wherein exposing the API in the object model for accessing the plurality of objects comprises providing an interactive content pane for providing:

at least one boundary for at least one content region within the interactive content pane, the at least one boundary limiting the at least one content region to a certain number of textual lines, a selection region for the at least one content region within the interactive content pane, a label for the at least one content region within the interactive content pane, the label being indicative of a specific type of content for the content region, a handle for the at least one content region within the interactive content pane, the handle being operative to drag the at least one content region to different portions of the electronic document, and a notification region for the at least one content region within the interactive content pane;

a place for instructional text within the at least one content region whenever the at least one content region is empty, the instruction text comprising instructions for inserting the specific type of content into the at least one content region;

receiving a selection of the selection region for the at least one content region;

providing, in response to the selection of the selection region for the at least one content region, a dropdown list corresponding to the plurality of objects, the dropdown list of the plurality of objects comprising entries associated with the plurality of properties, the plurality of methods, and the plurality of events;

receiving a selection of an entry in the drop down list; and utilizing, in response to receiving the selection of the entry, one of the plurality of properties, the plurality of methods, and the plurality of events associated with the selected entry to manage the selected at least one content region.

* * * * *